United States Patent
Zhang et al.

(10) Patent No.: US 10,331,897 B2
(45) Date of Patent: Jun. 25, 2019

(54) SYSTEM AND METHOD FOR PROTECTING PLAIN TEXT SCRIPTING LANGUAGE PROGRAMS IN A MAINFRAME REHOSTING PLATFORM

(71) Applicant: Oracle International Corporation, Redwood Shores, CA (US)

(72) Inventors: Weixuan (Wade) Zhang, Beijing (CN); Zhaoyong Zhang, Beijing (CN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 165 days.

(21) Appl. No.: 15/386,410

(22) Filed: Dec. 21, 2016

(65) Prior Publication Data

US 2017/0206363 A1    Jul. 20, 2017

Related U.S. Application Data

(60) Provisional application No. 62/280,816, filed on Jan. 20, 2016.

(51) Int. Cl.
*G06F 21/60* (2013.01)
*G06F 21/12* (2013.01)
(Continued)

(52) U.S. Cl.
CPC .......... *G06F 21/602* (2013.01); *G06F 9/4843* (2013.01); *G06F 13/1673* (2013.01); *G06F 21/12* (2013.01); *G06F 2221/2143* (2013.01)

(58) Field of Classification Search
CPC ... H04L 63/0428; G06F 21/602; G06F 9/4843
See application file for complete search history.

(56) References Cited

U.S. PATENT DOCUMENTS 5,678,044 A   10/1997   Pastilha
6,006,277 A   12/1999   Talati
(Continued)

OTHER PUBLICATIONS

Mark Rakhmilevich, ORACLE® Mainframe Rehosting Leveraging Oracle Tuxedo: Accelerating Cost Reduction and Application Moderationization, Jun. 2008, Updated Mar. 2009, 37 pages.
(Continued)

*Primary Examiner* — Dao Q Ho
(74) *Attorney, Agent, or Firm* — Tucker Ellis LLP

(57) ABSTRACT

In accordance with an embodiment, described herein is a system and method for protecting a scripting language application in a computing environment. An encryption-decryption module in the computing environment can use a native encryption-decryption library to encrypt the application. The encrypted application can be installed in an environment specific to a user of the computing environment. At runtime, the encryption-decryption module can use the native encryption-decryption library to decrypt the encrypted application into plain text statements, and store them into a memory buffer. The encryption-decryption module can further create a pipe, and fork a child process. The child process can call a scripting language engine, which can read the plain text statements from the memory buffer through the pipe, and execute the plain text statements. Once the execution is completed, the encryption-decryption module can be terminated, thereby clearing the data in the memory buffer.

18 Claims, 4 Drawing Sheets

(51) Int. Cl.
*G06F 9/48* (2006.01)
*G06F 13/16* (2006.01)

(56) References Cited

U.S. PATENT DOCUMENTS

| | | | |
|---|---|---|---|
| 8,010,582 B2 | 8/2011 | Zimowski | |
| 8,037,008 B2 | 10/2011 | Jung | |
| 8,539,488 B1 | 9/2013 | Havemose | |
| 8,745,076 B2 | 6/2014 | Pazdziora | |
| 8,881,139 B1 | 11/2014 | Acacio | |
| 9,043,764 B2 | 5/2015 | Ranganathan | |
| 9,430,505 B2 | 8/2016 | Padmanabhan | |
| 9,934,258 B2 | 4/2018 | Fuglsang | |
| 2007/0067771 A1* | 3/2007 | Kulbak | G06F 9/4843 |
| | | | 718/100 |
| 2010/0262970 A1 | 10/2010 | Havemose | |
| 2012/0159427 A1 | 6/2012 | Oara | |
| 2014/0068269 A1* | 3/2014 | Zhou | G06F 21/10 |
| | | | 713/171 |

OTHER PUBLICATIONS

George Eadon et al., "Supporting Table Partitioning by Reference in Oracle", SIGMOD '08, Jun. 9-12, 2008, Vancouver, BC, Canada, Copyright 2008, 12 Pages.

Oracle, "Oracle Tuxedo Application Runtime for Batch Reference Guide 12c Release 1 (12.1.1)", Sep. 2013, Copyright © 2010, 2013, 156 Pages.

United States Patent and Trademark Office, Office Action dated Nov. 19, 2018 for U.S. Appl. No. 15/386,392, 11 Pages.

Oracle, "Oracle Tuxedo Application Rehosting Workbench" Reference Guide 12c Release 2(12.1.3), Apr. 2014, Copyright © 2012, 2014, 500 pages.

United States Patent and Trademark Office, Office Action dated Mar. 1, 2019 for U.S. Appl. No. 15/386,405, 18 Pages.

\* cited by examiner

SYSTEM AND METHOD FOR PROTECTING PLAIN TEXT SCRIPTING LANGUAGE PROGRAMS IN A MAINFRAME REHOSTING PLATFORM

CLAIM OF PRIORITY

This application claims the benefit of priority to U.S. Provisional Application titled "SYSTEM AND METHOD FOR PROTECTING PLAIN TEXT SCRIPTING LANGUAGE PROGRAMS IN A TRANSACTIONAL PROCESSING ENVIRONMENT", Application No. 62/280,816, filed Jan. 20, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application re-hosting, and are particularly related to a system and method for protecting plain text scripting language programs in a computing environment.

BACKGROUND

Many programs are written in a scripting language and are delivered in a plain text format. A corresponding engine or interpreter can read the programs and run them directly. The plain text files of the programs can be viewed, copied, and revised by any person who has access to the plain text files. The problem can become more serious when a scripting language mainframe application is migrated from a mainframe system to an open rehosting platform.

SUMMARY

In accordance with an embodiment, described herein is a system and method for protecting a scripting language application in a computing environment. An encryption-decryption module in the computing environment can use a native encryption-decryption library to encrypt the application. The encrypted application can be installed in an environment specific to a user of the computing environment. At runtime, the encryption-decryption module can use the native encryption-decryption library to decrypt the encrypted application into plain text statements, and store them into a memory buffer. The encryption-decryption module can further create a pipe, and fork a child process. The child process can call a scripting language engine, which can read the plain text statements from the memory buffer through the pipe, and execute the plain text statements. Once the execution is completed, the encryption-decryption module can be terminated, thereby clearing the data in the memory buffer.

DETAILED DESCRIPTION

In an open system, programs written in a scripting language are more likely to viewed and copied by an unauthorized person due to the open nature of the computing environment.

In accordance with an embodiment, described herein is a system and method for protecting a scripting language application in a computing environment. An encryption-decryption module in the rehosting platform can use a native encryption-decryption library to encrypt the application. The encrypted application can be installed in an environment specific to a user of the computing environment. At runtime, the encryption-decryption module can use the native encryption-decryption library to decrypt the encrypted application into plain text statements, and store them into a memory buffer. The encryption-decryption module can further create a pipe, and fork a child process. The child process can call a scripting language engine, which can read the plain text statements from the memory buffer through the pipe, and execute the plain text statements. Once the execution is completed, the encryption-decryption module can be terminated, thereby clearing the data in the memory buffer.

The system and method described above can be used to protect scripting language applications in a plurality of computing environments. The disclosure describes a mainframe rehosting platform as an example computing environment in which various embodiments of the invention can be used.

Mainframe Rehosting Platform

Figure 1:
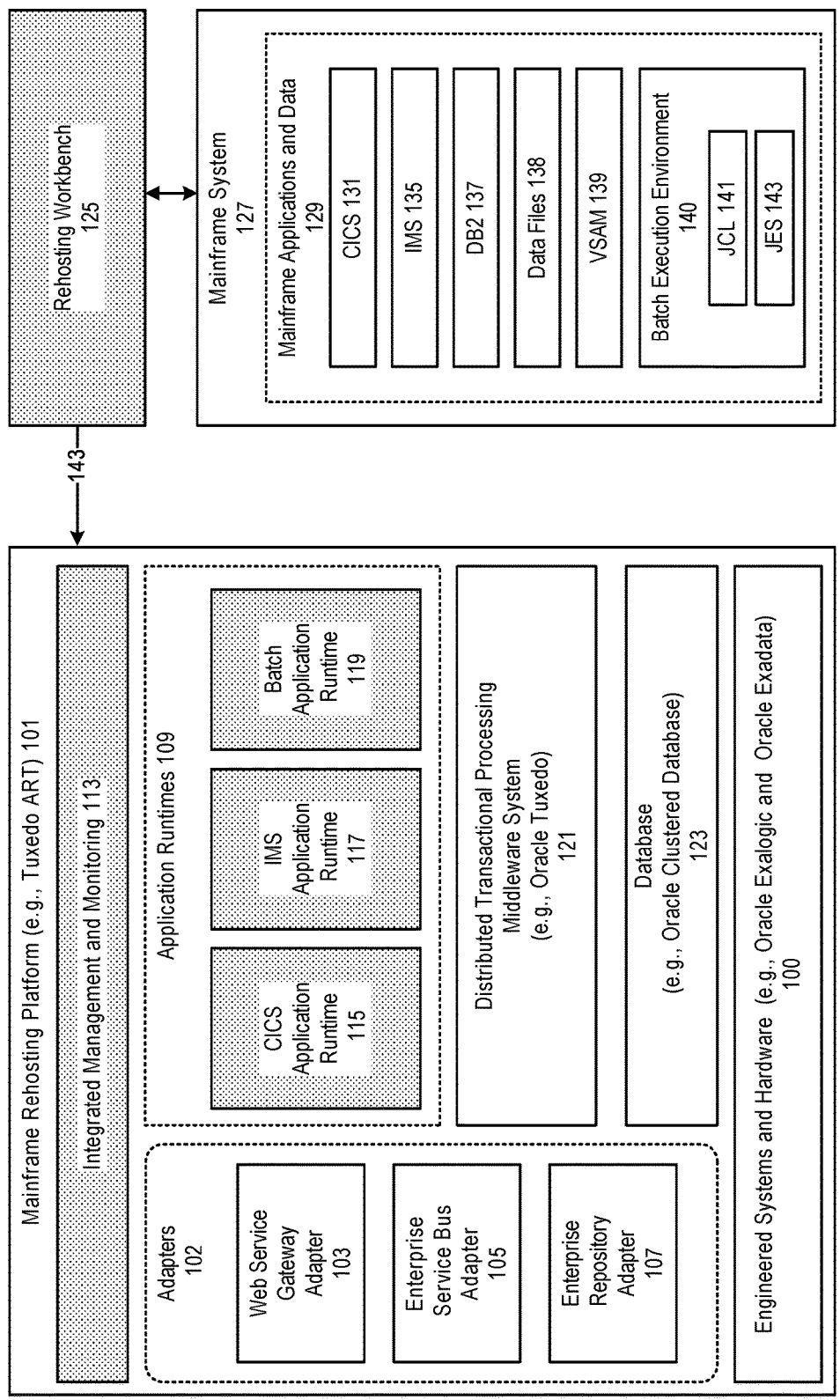
FIG. 1 illustrates an exemplary mainframe rehosting platform, in accordance with an embodiment.

FIG. 1 illustrates an exemplary mainframe rehosting platform, in accordance with an embodiment.

As shown in FIG. 1, a mainframe rehosting platform 101 and a rehosting workbench 125 can provide a system for rehosting mainframe applications and data 129 on lower-cost platforms without losing business value or sacrificing Quality of Service (QoS).

In accordance with an embodiment, the mainframe applications and data 129 to be rehosted can currently run on a mainframe system 127, for example, an IBM™ mainframe system; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe system. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe system 127 can include a batch execution environment 140 that can support JOB Control Language (JCL) 141 and a job entry subsystem (JES) 143. JCL can be a script language to implement batch processes on the mainframe system. JES can be a major component of an operating system on the mainframe system, can receive jobs into the mainframe system, schedule the jobs for processing, and control their output processing.

As further shown in FIG. 1, the mainframe rehosting platform can include a software stack compatible with the mainframe system to run mainframe applications with little to no change to minimize the risks and cost of migration; and an integrated management and monitoring component 113 for use in monitoring the mainframe rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 143 the mainframe applications 129 from the mainframe system 127 to the mainframe rehosting platform 101.

In accordance with an embodiment, the CICS application runtime can include a set of Tuxedo servers to simulate core features of the mainframe CICS. The Tuxedo system servers can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion.

In accordance with an embodiment, the IMS application runtime can provide a set of DL/I calls for use by COBOL/C applications migrated from the mainframe system 127; a robust session environment to handle concurrent connections from a plurality of 3270 terminals; a robust execution environment to provide OLTP to process transaction codes received from the 3270 terminals via calling the migrated COBOL/C applications; and a DB plug-in on the mainframe rehosting platform.

In accordance with an embodiment, the batch application runtime 119 can include a set of Tuxedo servers to simulate mainframe JES core features. For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe system 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL JCL. The code migration tools can apply sophisticated language processing to adapt COBOL code between compiler dialects, transform JCL, adapt SQL calls for differences between DB2 and Oracle DB. For data migration, the data migration tools can generate target schemas, including Oracle DDL, in the mainframe rehosting platform 101, and can automate data reloading to the generated target schemas.

In accordance with an embodiment, the rehosting workbench can be used in UNIX command line mode, and an Eclipse IDE graphical environment; and can generate system configuration files for the mainframe rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Protecting Plain Text Scripting Language Applications

Applications written in a plain text scripting language are susceptible to pirating, particularly when the applications are hosted or rehosted in an open platform, such as the mainframe rehosting platform described above.

These applications, for example, Perl programs, can be protected by converting them into ByteCode. However, ByteCode is not stable, particularly, if a compile-time environment and a runtime environment use different versions of a scripting language interpreter.

In accordance with an embodiment, the system and method described herein can be used to protect a scripting language application in a mainframe rehosting platform. An encryption-decryption module in the rehosting platform can use a native encryption-decryption library to encrypt the application. The encrypted application can be installed in an environment specific to a user in the mainframe rehosting platform. At runtime, the encryption-decryption module can use the native encryption-decryption library to decrypt the encrypted application into plain text statements, and store them into a memory buffer. The encryption-decryption module can further create a pipe, and fork a child process. The child process can call a scripting language engine, which can read the plain text statements from the memory buffer through the pipe, and execute the plain text statements. Once the execution is completed, the encryption-decryption module can terminate, thereby clearing the data in the memory buffer.

In accordance with an embodiment, when in an encrypted non-readable format, the scripting language application is installed in an environment specific to a user, and is accessible only by the encryption-decryption module; when in a plain text format, the scripting language application is a memory buffer inside the encryption-decryption module, which can be destroyed when the execution of the application is completed. Further, native encryption/decryption libraries are used for encryption and decryption.

The above features can effectively protect the scripting language application from being copied or viewed after being installed into an open rehosting platform, such as Oracle's Tuxedo ART batch runtime.

In accordance with an embodiment, the scripting language application can be migrated from a mainframe system to the mainframe rehosting platform, or newly developed for the mainframe rehosting platform.

In accordance with an embodiment, the system and method does not impact the general process of development and release. The decryption and the execution of the scripting language application can be automatic and without a user's awareness.

In addition, the system and method can use a plurality of existing encryption/decryption algorithms and can be applied to a plurality of scripting languages.

Further, the system and method described above is more secure, does not rely on Perl ByteCode, and is compatible with a plurality of different types of platforms.

Figure 2:
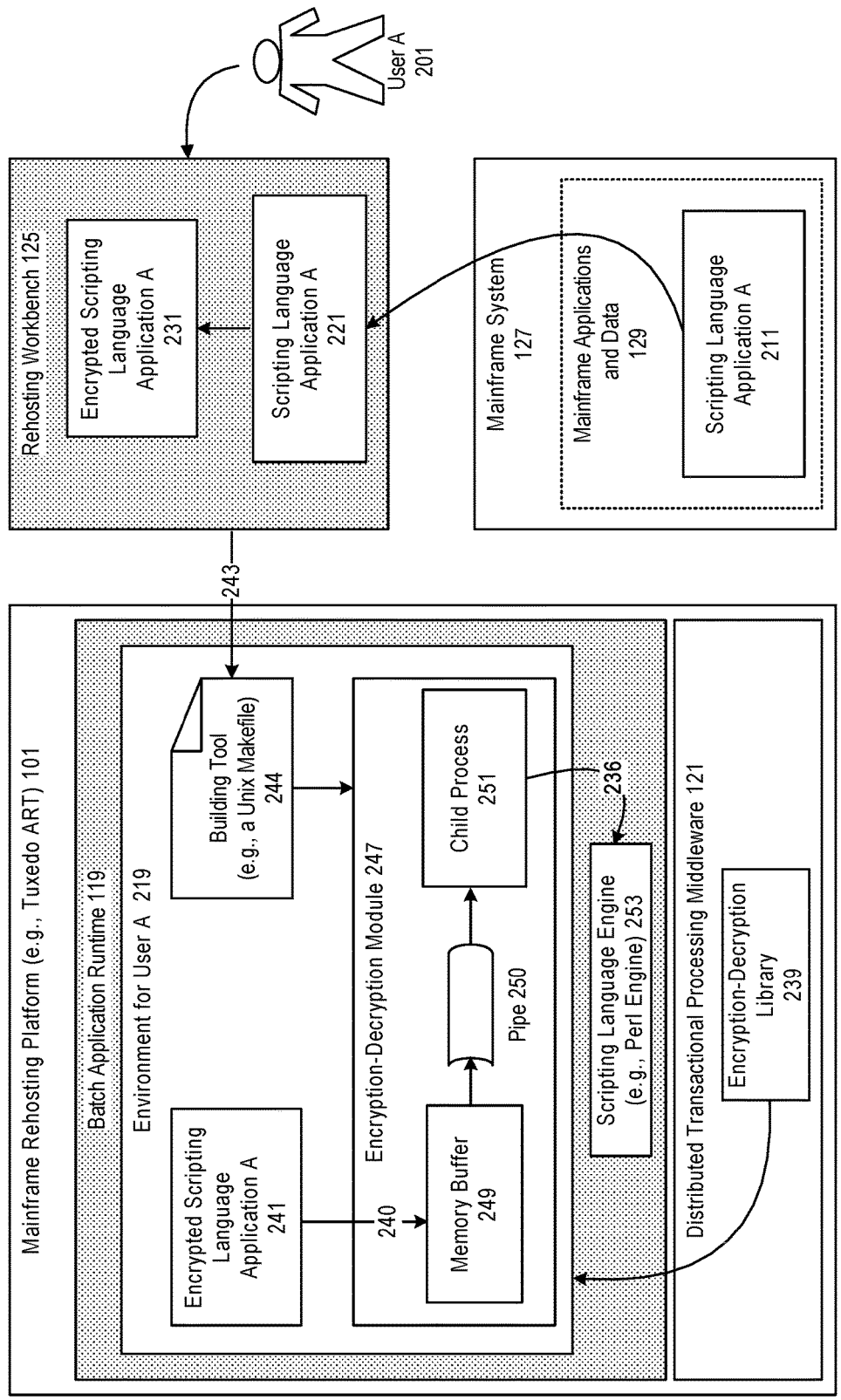
FIG. 2 illustrates a system for protecting a scripting language application in a mainframe rehosting platform, in accordance with embodiment.

FIG. 2 illustrates a system for protecting a scripting language application in a mainframe rehosting platform, in accordance with embodiment.

As shown in FIG. 2, a user, for example, user A 201, can migrate a scripting language application A 211 from the mainframe system 127 to the rehosting workbench 125.

As further shown, the system can include an encryption-decryption module 247 and a building tool 244 in an environment 219 specific to User A.

In accordance with an embodiment, the encryption-decryption module can be an executable written in Perl for encrypting and decrypting the scripting language application, and can implicitly call a scripting language engine to run the decrypted scripting language application. The building tool can be UNIX makefile used to simplify building a program executable from various modules.

In accordance with an embodiment, the user can invoke 243 the building tool from the rehosting workbench, to build scripting language application A 221 before installing it to the mainframe rehosting platform. The building tool can further call the encryption-decryption module, which can use an encryption-decryption library 239 to encrypt scripting language application A 221 into encrypted scripting language application A 231.

In accordance with an embodiment, during the execution of the encrypted scripting language application A 241, the encryption-decryption module can use the encryption-decryption library to decrypt the encrypted application into a plurality of plain text statements, and store 240 the plain text statements into a memory buffer 249 inside the encryption-decryption module.

In accordance with an embodiment, the encryption-decryption module can further create a pipe 250 (for example, a UNIX pipe), and fork a child process 251 from the parent process in which the encryption-decryption module is executing.

In accordance with an embodiment, in the child process, a command line "perl-<perl_option>" can be executed, with its stdin being the pipe, to call 236 a scripting language engine 253. The command line "perl-xxx" can enable a scripting language engine (i.e. Perl engine) to read statements from stdin rather than from a file.

In accordance with an embodiment, in the parent process, the plain text statements in the memory buffer can be written to the pipe, from which the scripting language engine can read the plain text statements and execute them. Once the execution is completed, the encryption-decryption module can be terminated, thereby clearing the data in the memory buffer.

In accordance with an embodiment, an exemplary list of interfaces of the encryption-decryption module can be illustrated as in Listing 1 below. In the Listing 1, "artperl" is the name of the encryption-decryption module.

Listing 1

Interface of artperl
Usage:
    artperl -e -i <srcfile> -o <targetfile> [-k <key>]
    artperl -f -i <srcfile> -o <targetfile> [-k <key>]
    artperl -s <perlfile> -p <perl_option> [-m <dbgfile>] [-k <key>]
<OPTION>
    -e  : encrypt mode, encrypt input file to output file
    -f  : (debug version only) decrypt mode: decrypt input file to output file

Listing 1

```
-i <srcfile> : specify full path of input file
-o <targetfile> : specify full path of output file
-k <key> : specify key for encryption or decryption
-s <perlfile> : used in run mode, specify the full path of encrypted
    perl script file
-p <perl_option> : used in run mode, specify the option for internal
    perl invocation
-m <dbgfile> : (debug version only) used in run mode, dump
    decrypted perl script
<Example>
    *Encrypt perl script:
    artperl -e -i mi_ConvertScript.pl -o enc.pl
    *Decrypt perl script(available only in debug version):
    artperl -f -i enc.pl -o orig.pl
    *Run perl script (-m is only available in debug version):
    artperl -s mi_ConvertScript.pl -p "$APPDIR/JOBA > JOBA.out
    2>/dev/null"
```

Figure 3:
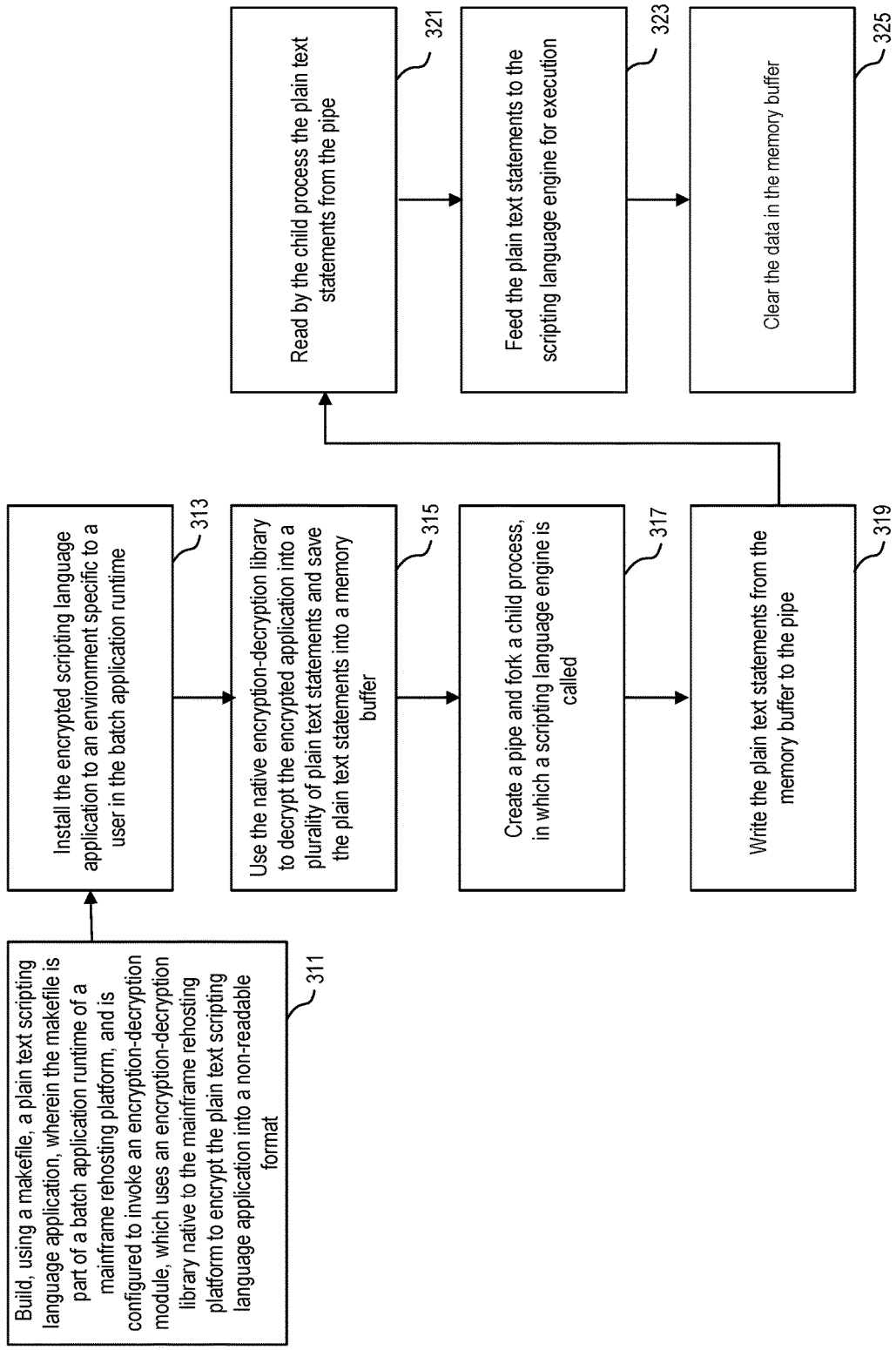
FIG. 3 illustrates a flow chart for protecting a scripting language application in a mainframe rehosting platform, in accordance with embodiment.

FIG. 3 illustrates a flow chart for protecting a scripting language application in a mainframe rehosting platform, in accordance with embodiment.

As shown in FIG. 3, at step 311, a plain text scripting language application is built using a makefile, wherein the makefile is part of a batch application runtime of a mainframe rehosting platform, and is configured to invoke an encryption-decryption module, which uses an encryption-decryption library native to the mainframe rehosting platform to encrypt the plain text scripting language application into a non-readable format.

At step 313, the encrypted scripting language application is installed into an environment specific to a user in the batch application runtime.

At step 315, at runtime, the encryption-decryption module uses the native encryption-decryption library to decrypt the encrypted application into a plurality of plain text statements and save the plain text statements into a memory buffer.

At step 317, the encryption-decryption module creates a pipe and fork a child process, in which a scripting language engine is called.

At step 319, the encryption-decryption module writes the plain text statements from the memory buffer to the pipe.

At step 321, the child process reads the plain text statements from the pipe.

At step 323, the child process feeds the plain text statements to the scripting language engine for execution.

At step 325, the encryption-decryption module is terminated at the end of the execution, and the data in the memory buffer is cleared.

Figure 4:
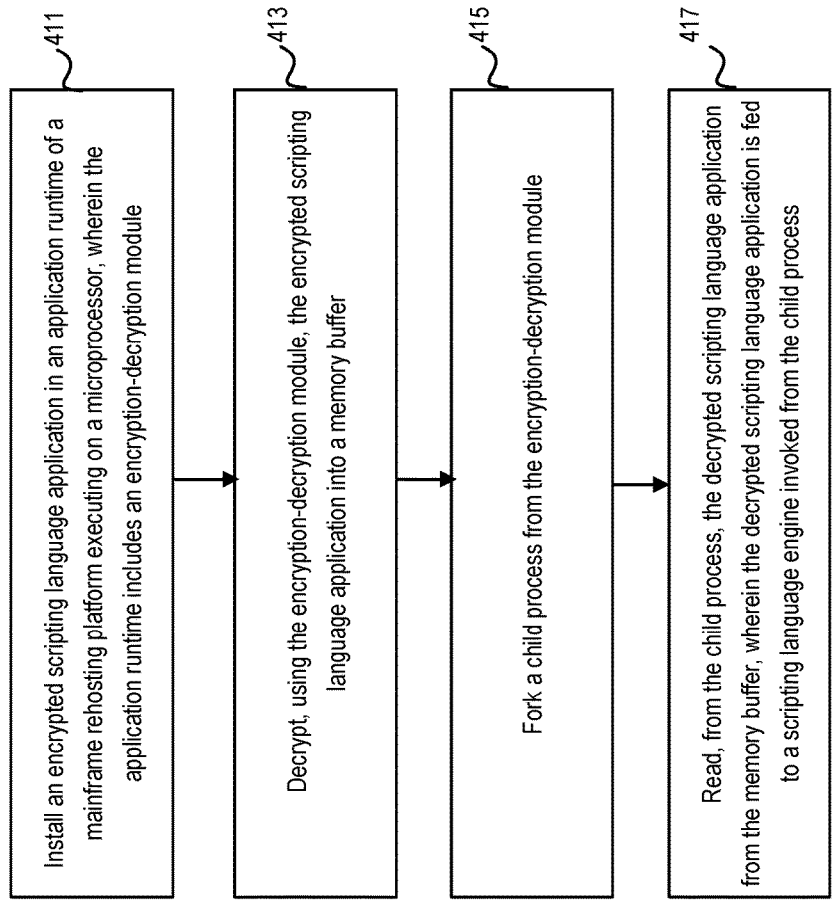
FIG. 4 illustrates a method for protecting a scripting language application in a mainframe rehosting platform, in accordance with embodiment.

FIG. 4 illustrates a method for protecting a scripting language application in a mainframe rehosting platform, in accordance with embodiment.

As shown in FIG. 4, at step 411, an encrypted scripting language application is installed in an application runtime of a mainframe rehosting platform executing on a microprocessor, wherein the application runtime includes an encryption-decryption module.

At step 413, the encrypted scripting language application is decrypted into a memory buffer using the encryption-decryption module.

At step 415, a child process is forked from the encryption-decryption module.

At step 417, the decrypted scripting language application is read from the memory buffer, and fed to a scripting language engine invoked from the child process.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for protecting a scripting language application, the system comprising:
   a microprocessor;
   a computing environment executing on the microprocessor, wherein the computing environment comprises a scripting language engine;
   a building tool executable in a build runtime of the computing environment to build by an associated user of the system the scripting language application; and
   an encryption-decryption module executable in the build runtime of the computing environment executing on the microprocessor and in an application runtime of the computing environment executing on the microprocessor, wherein the encryption-decryption module is configured to
      be invoked in the build runtime by the building tool operable to encrypt, using an encryption-decryption library native to the computing environment, the scripting language application into an encrypted scripting language application migrated to the computing environment,
      decrypt in the application runtime using the encryption-decryption library native to the computing environment the encrypted scripting language application into a memory buffer of the encryption-decryption module as a plurality of plain text statements,
      write the plurality of plain text statements into a pipe, and
      fork in the application runtime a child process within the encryption-decryption module, wherein the child process is configured to
invoke the scripting language engine,
read the plurality of plain text statements from the memory buffer in the encryption-decryption module through the pipe, and
feed the plurality of plain text statements from the pipe to the scripting language engine for execution of the plurality of plain text statements by the scripting language engine.

2. The system of claim 1, wherein the computing environment is a mainframe rehosting platform, an application server, or a cloud service.

3. The system of claim 1, wherein the encrypted scripting language application is in a non-readable format, the computing environment is specific to the associated user, and the encrypted scripting language application is migrated to the computing environment specific to the associated user.

4. The system of claim 1, wherein the scripting language application is encrypted and decrypted using the encryption-decryption library native to a rehosting platform.

5. The system of claim 1, wherein the scripting language application is written in one of Perl or a UNIX shell script.

6. The system of claim 1, wherein the encryption-decryption module is further configured to clear the plain text statements from the memory buffer of the encryption-decryption module when the execution of the scripting language application is completed.

7. The system of claim 1, wherein the encrypted scripting language application is accessible only to the encryption-decryption module.

8. A method for protecting a scripting language application, the method comprising:
installing an encrypted scripting language application in a computing environment executing on a microprocessor, wherein the computing environment comprises a building tool, an encryption-decryption module and a scripting language engine;
invoking the encryption-decryption module by the building tool to encrypt, using an encryption-decryption library native to the computing environment, the scripting language application into an encrypted scripting language application migrated to the computing environment;
decrypting, using the encryption-decryption module and the encryption-decryption library native to the computing environment, the encrypted scripting language application into a memory buffer of the encryption-decryption module as a plurality of plain text statements;
writing the plurality of plain text statements into a pipe;
forking a child process within the encryption-decryption module; and
reading, from the child process, the plurality of plain text statements from the memory buffer of the encryption-decryption module through the pipe,
wherein the plurality of plain text statements is fed to the scripting language engine invoked from the child process for execution of the plurality of plain text statements by the scripting language engine.

9. The method of claim 8, wherein the encrypted scripting language application is in a non-readable format, the computing environment is specific to the associated user, and the encrypted scripting language application is migrated to the computing environment specific to the associated user.

10. The method of claim 8, wherein the scripting language application is encrypted and decrypted using a library native to a rehosting platform.

11. The method of claim 8, wherein the scripting language application is written in one of Perl or a UNIX shell script.

12. The method of claim 8, further comprising clearing by the encryption-decryption module plain text statements of the decrypted scripting language application from the memory buffer of the encryption-decryption module when the execution of the scripting language application is completed.

13. A non-transitory computer readable storage medium, including instructions stored thereon which when read and executed by one or more computers cause the one or more computers to perform the steps comprising:
installing an encrypted scripting language application in a computing environment executing on a microprocessor, wherein the computing environment comprises a building tool, an encryption-decryption module and a scripting language engine;
invoking the encryption-decryption module by the building tool to encrypt, using an encryption-decryption library native to the computing environment, the scripting language application into an encrypted scripting language application migrated to the computing environment;
decrypting, using the encryption-decryption module and the encryption-decryption library native to the computing environment, the encrypted scripting language application into a memory buffer of the encryption-decryption module as a plurality of plain text statements;
writing the plurality of plain text statements into a pipe;
forking a child process within the encryption-decryption module; and
reading, from the child process, the plurality of plain text statements from the memory buffer of the encryption-decryption module through the pipe,
wherein plurality of plain text statements is fed to the scripting language engine invoked from the child process for execution of the plurality of plain text statements by the scripting language engine.

14. The non-transitory computer readable storage medium according to claim 13, further comprising clearing by the encryption-decryption module plain text statements of the decrypted scripting language application from the memory buffer of the encryption-decryption module when the execution of the scripting language application is completed.

15. The non-transitory computer readable storage medium according to claim 13, wherein the encrypted scripting language application is in a non-readable format, the computing environment is specific to the associated user, and the encrypted scripting language application is migrated to the computing environment specific to the associated user.

16. The non-transitory computer readable storage medium according to claim 13, wherein the scripting language application is encrypted and decrypted using the encryption-decryption library native to a rehosting platform.

17. The non-transitory computer readable storage medium according to claim 13, wherein the scripting language application is written in one of Perl or a UNIX shell script.

18. The non-transitory computer readable storage medium according to claim 13, wherein the encrypted scripting language application is accessible only to the encryption-decryption module.

* * * * *

UNITED STATES PATENT AND TRADEMARK OFFICE
CERTIFICATE OF CORRECTION

PATENT NO.         : 10,331,897 B2
APPLICATION NO.    : 15/386410
DATED              : June 25, 2019
INVENTOR(S)        : Zhang et al.

Page 1 of 1

It is certified that error appears in the above-identified patent and that said Letters Patent is hereby corrected as shown below:

In the Claims

In Column 10, Line 14, in Claim 13, after "perform" delete "the".

In Column 10, Line 38, in Claim 13, before "plurality" insert -- the --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*